June 15, 1965 S. A. NOREN Re. 25,801

HYDRAULIC ROTARY ENGINE

Original Filed May 6, 1959 3 Sheets-Sheet 1

HYDRAULIC ROTARY ENGINE

Original Filed May 6, 1959 3 Sheets-Sheet 2

United States Patent Office

Re. 25,801
Reissued June 15, 1965

25,801
HYDRAULIC ROTARY ENGINE

Sven A. Noren, Valhallavagen 79,
Stockholm 70, Sweden

Original No. 2,979,036, dated Apr. 11, 1961, Ser. No. 811,375, May 6, 1959. Application for reissue June 12, 1963, Ser. No. 287,744
Claims priority, application Sweden, May 9, 1958, 4,487/58
4 Claims. (Cl. 103—126)

Figure 1:
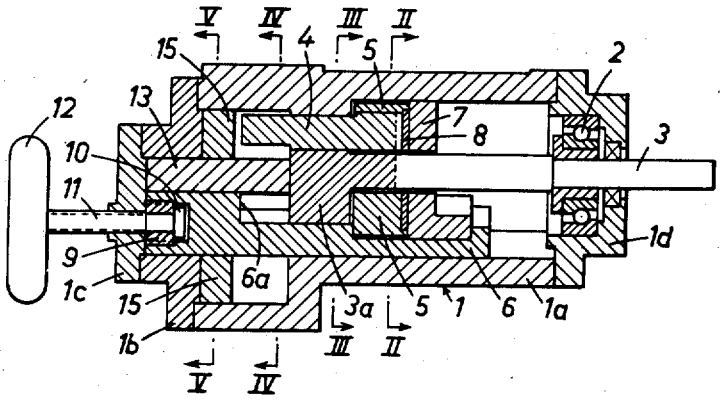
Figure 2:
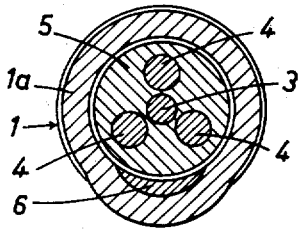

Matter enclosed in heavy brackets [ ] appears in the original patent but forms no part of this reissue specification; matter printed in italics indicates the additions made by reissue.

This invention relates to hydraulic rotary engines, such as pumps, motors and the like of the type comprising a cylindrical working chamber in which there rotates an array of blades making with their outer sides a sealing fit with the circumferential wall of the chamber and with their inner sides a sealing fit with the convex surface of a crescent-shaped central portion, said array of blades cooperating with a smaller rotor having blades meshing in sealing relation with the tooth spaces of said first array of blades and making a sealing fit with the concave surface of said crescent-shaped central portion.

In such types of hydraulic rotary engines a pulsating discharge flow is obtained which results in undesired pressure pulsations, vibrations and noise.

Moreover in gear pumps of the above mentioned type fluid may be trapped at the meshing point of the gear teeth due to the necessary double sealing engagement of the meshing teeth. Such trapped fluid gives rise to damaging excessive pressure forces especially at high rotational speeds.

The object of the invention is to proivde a rotary engine of said general type which is free from pulsations in the flow of liquid and in which the fluid may not be trapped at the gear teeth meshing point.

To this end the rotary engine of the type referred to comprises according to the invention a first rotor having an outer array of blades making a sealing fit not only with the outer circumferential wall of the working chamber but also with the circumferential wall of the central hub portion having a groove therein eccentric with respect to the axis of the working chamber, and a second rotor having an inner array of blades making a sealing fit only with said eccentric groove and engaging into the spaces between the blades of said outer array.

Thereby the outer array serves merely the purpose of a valve and does not affect the flow capacity of the rotary engine which is exclusively determined by the dimension of the axial sectional area of that portion of blades of the inner array extending into the working chamber.

Said last named blades need not extend along the whole axial width of the working chamber.

Another object of the invention is to provide regulating means whereby the capacity of the rotary engine may be varied. This regulating means comprises slide means for axially moving the second rotor so that its blades take up a smaller or larger volume of the working space, said slide means forming the bottom of the groove in said central hub portion thereby securing the sealing fit of the blades in said groove.

According to the invention the blades of the inner array may engage the blades of the outer array for driving the latter or the two rotors may be synchronized in any other way [to prevent engagement between the blades of the two arrays] *so that the blades rotate substantially with the same peripheral velocity in the meshing space.*

Figure 6:
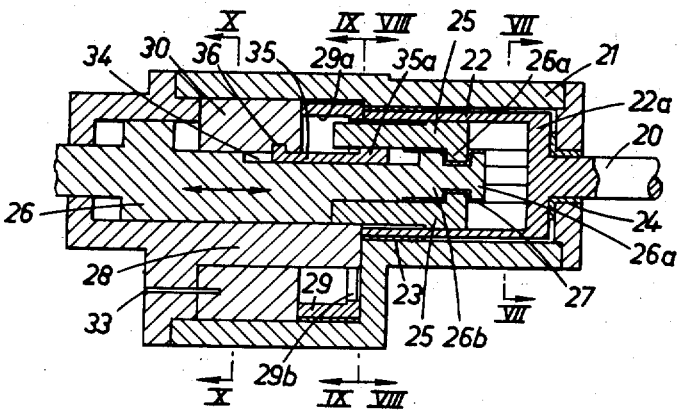
Figure 7:
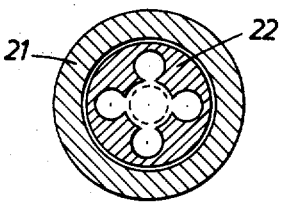
Figure 8:
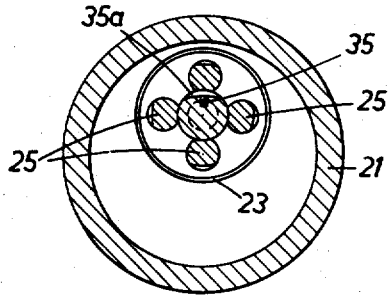
Figure 9:
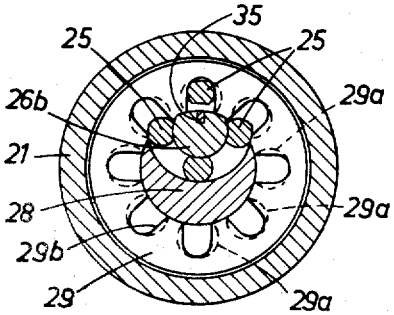
Figure 10:
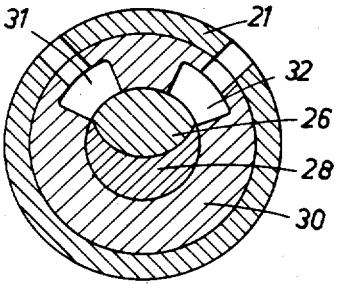
Figure 12:
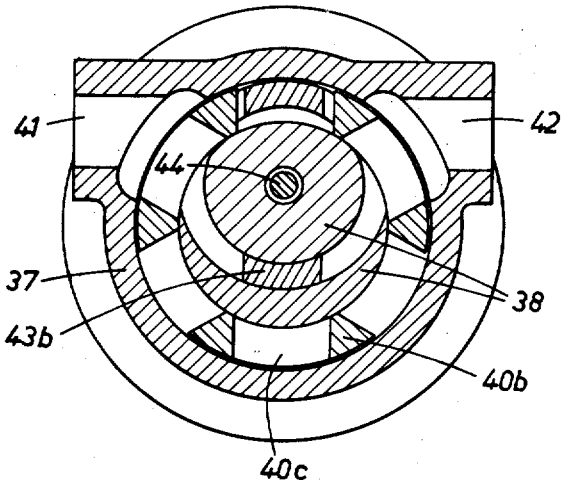
Figure 13:
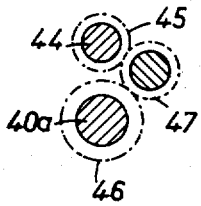
Figure 11:
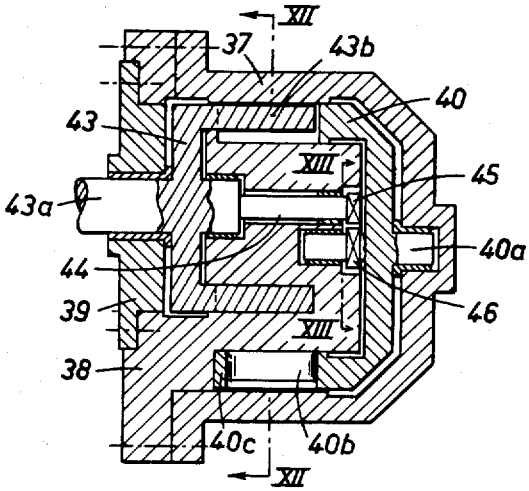

The rotary engine according to the invention may be carried into practice in various ways and three embodiments according to the invention are illustrated by way of example in the accompanying drawings, in which FIGURE 1 is a sectional view of a rotary engine according to the invention in a plane passing through the axis of rotation of the engine, FIGURES 2 to 5 are cross sectional views on the lines II—II, III—III, IV—IV and V—V respectively of FIGURE 1, FIGURE 6 is a sectional view of a second embodiment of the rotary engine in a plane passing through the axis of rotation of the engine, FIGURES 7 to 10 are cross sectional views on the lines VII—VII, VIII—VIII, IX—IX and X—X respectively of FIGURE 6, FIGURE 11 is a sectional view of a third embodiment of the rotary engine in a plane passing through the axis of rotation of the engine, FIGURE 12 is a cross sectional view on the line XII—XII of FIGURE 11, and FIGURE 13 is a part sectional view showing some details of the rotary engine shown in FIGURE 11.

Figure 3:
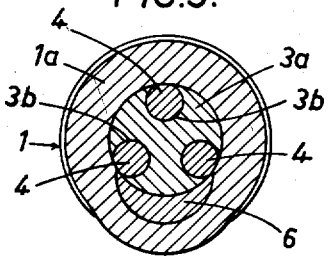

Referring now particularly to FIGURES 1–5 the rotary engine comprises a housing generally designated 1 and including a shell 1a and end portion 1b, 1c and 1d. A bearing 2 for a rotating shaft 3 is mounted in the rear end portion 1d. The shaft 3 may be connected to a prime mover or an apparatus to be driven. Within the housing 1 the shaft 3 is formed as a cylindrical carrier or flange member 3a (FIGS. 1 and 3). An array of circular holes 3b (FIG. 3) parallel with the axis of the shaft 3 extends through said flange member 3a. The peripheries of said holes 3b may suitably intersect the periphery of said flange 3a.

Cylindrical pins 4 are movably inserted in said holes 3b so that they project to both sides therefrom. The rearwardly (to the right in FIG. 1) projecting end portions of the pins 4 are secured in correspondingly shaped holes in a circular holding element 5 being slidable along the shaft 3 (see FIGURES 1 and 4). The holder 5 is supported by a bracket 7 and an interconnected thrust bearing 8 so that the holder 5 can freely rotate with respect to the bracket 7. The holder 5 and the bracket 7 engage a suitable recess in a slide 6, movable along the shaft 3 and extending into the forward end portion 1b (the left end portion in FIGURE 1) of the housing 1. A threaded spindle 11 engages the thread of a threaded hole in the forward end cover 1c and is rotatably connected to the slide 6 by means of a reduced portion between its threaded part and its end 10, said reduced portion cooperating with a bushing 9 secured to said slide 6. Thereby the axial movement of said spindle 11 is transmitted to the slide 6 when the spindle 11 is operated by its handle 12.

Figure 4:
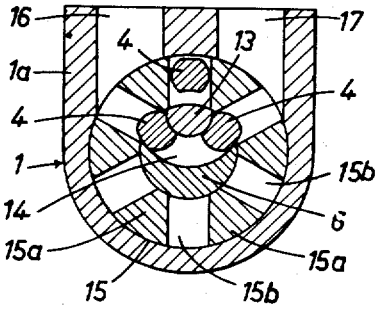
Figure 5:
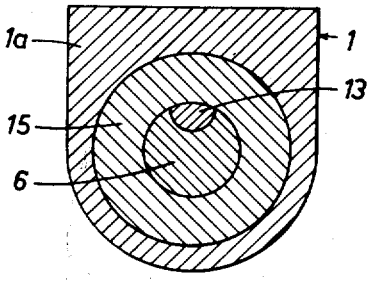

The last mentioned end portions of the pins 4 extend into the cylindrical working chamber of the rotary engine, said chamber suitably having a larger diameter than said carrier flange member 3a. The cylindrical working chamber is defined by the shell 1a and the front end portion 1b of the housing. The portions of the pins 4 extending into the working chamber engage the spaces 15b between axial teeth 15a at the circumference of a cylindrical element 15 rotatably mounted in said cylindrical working chamber. The teeth 15a of said element 15 engage with their outer surfaces the peripheral surface of said working chamber and with their inner surfaces the convex cylindrical face of a crescent shaped portion of the slide 6 (FIGURE 4). The concave cylindrical surface of said crescent-shaped portion defines together with the above mentioned centre hub 13 an arcuate channel forming a sliding fit for the pins 4.

It is to be noticed that the slide 6 is axially movable along said centre hub 13 together with the rotor 5 and its pins 4 and has an end wall 6a between its concave surface of the crescent shaped portion and said hub 13 forming a tight sliding fit with the end surface of said pins 4. The surface of said hub 13 opposite said channel 14 is shaped to form part of the convex cylindrical surface of said crescent shaped portion of the slide 6, and has an extension sufficient to bridge the tooth space 15b between two teeth 15a (compare FIGURES 4 and 5).

Inlet and outlet openings 16 and 17 respectively are provided as shown in FIGURE 4 at opposite sides of a line through the centres of said hub 13 and said slide 6. These openings are separated by a partition wall which is sufficiently thick to bridge the tooth space 15b between each pair of teeth 15a.

In the rotary engine according to the invention the larger or outer toothed rotor 15 serves merely as a valve while the flow capacity of the engine is exclusively determined by the smaller or inner toothed rotor 3–5. The flow capacity may be calculated by the volume of the ring-shaped body generated by rotation of the portions of the pins 4 projecting into the working chamber times the number of revolutions per time unit.

From this condition it is apparent that the discharge flow will be constant as exclusively determined by the uniformly rotating rotor 3–5. No pulsation will occur provided the rotational speed of said rotor is uniform.

Since in fact the outer rotor 15 only acts as a valve and does not influence the flow, the shape of its tooth spaces need not be accurate, and the rotor 15 is also permitted to rotate irregularly without resulting in an uneven flow.

Moreover the fluid cannot be trapped as suitable clearances may be left around each pin 4 in engaged position in the tooth spaces of the rotor 15.

These features are of special importance when the rotary engine acts as a pump where an irregular flow may give rise to injurious cavitation phenomena and noise or when the rotary engine forms part of a hydraulic transmission that must not be subjected to any vibrations or when the rotary engine acts as a flow meter, where the angular movement thus corresponds exactly to the quantity of fluid passing through the meter.

By adjusting the length of the parts of the pins 4 projecting into the working chamber with the aid of the slide 6 and its adjustment members 9–12 the flow capacity can be continuously regulated from full capacity to approximately zero.

In FIGURES 6–10 a second embodiment of the rotary engine according to the invention is shown. This engine comprises a housing 21, having an end portion including a bearing 24 for a shaft 20, which within the housing is provided with a cylindrical carrier member 22, 22a (FIGURES 6 and 7) rotatably supported by a bearing 23 and provided with axial holes in which the pins 25 are slidably mounted. The pins 25 have a shape corresponding to that of the pins 4 of the first embodiment and engage with fingers 25a a reduced portion formed between shoulders 26a and 26b of a slide 26. The slide 26 is radially movable by adjustment means (not shown). Suitable bearing surfaces 27 are provided between the fingers 25a and the reduced portion of the slide 26 to permit the assembly of pins 25 to rotate freely.

The pins 25 extend into a working chamber and mesh with radial tooth spaces 29b of an annular rotatable valve 29 of larger diameter corresponding to the motor of the first embodiment.

In this second embodiment the slide 26 forms the centre hub 26b and has a groove 34 engaged by a key 35 having at one end provided with a crescent-shaped head 35a (FIGURES 6 and 8) and at its other end with a projection 36 engaging a stationary member 30 of the housing. Said stationary member 30 is by means of a pin 33 prevented from moving angularly. A portion 28 of one end wall of the housing forms a crescent-shaped-projection extending into the correspondingly shaped space between the inner surface of the valve 29 and the outer surface of the pins 25 so that an arcuate channel is formed between said crescent-shaped projection 28 and the centre hub 26 (see FIGURES 1 and 9).

Suitably the tooth spaces in the valve 29 are widened along an axial portion of their length so that clearances are formed around the pins 25 in engaged positions.

Axial inlet and outlet channels 31 and 32 are provided in the stationary member 30 and discharge through the wall of the housing 21 (FIGURE 10) to be connected to suitable conduits.

The operation of the rotary engine shown in FIGURES 6–10 corresponds to that of the first embodiment described in connection with FIGURES 1–5.

Due to the central location of the slide the adjustment forces will be transmitted to the inner rotor 22–25 symmetrically about its axis of rotation so that no distorting forces appear.

In FIGURES 11–13 a third embodiment is shown which is especially suitable for metering purposes.

A cup-shaped shell member 37 of the housing is at its open end provided with a member 38 having projections forming the crescent-shaped portion between an outer valve 40 and an inner rotor 43 as well as the centre hub.

The working chamber of the flow meter is formed between the shell 37 and its end member 38. In said working chamber the obturator 40 is rotatably mounted by means of its shaft 40a supported by bearings in the shell 37 and said member 38. The obturator 40 comprises a disk having axial teeth 40b at its peripheral edge meshing with axial pins 43b of the inner rotor 43. The shaft 43a of said inner rotor 43 is rotatably mounted in a cover member 39 secured to said member 38.

To obtain a synchronized movement of the two rotating elements 40 and 43 *so that the axial pins 43b move with the same peripheral velocity as the tooth spaces between the teeth 40b*, the shaft of the inner rotor has an inwardly extended portion 44 provided at its end with a gear wheel 45 meshing with a gear wheel 46 of the valve 40 through an intermediate gear 47 rotatably mounted in the stationary member 38.

Since the pins 43b of the inner rotor 43 only mesh with every second of the spaces between the teeth 40b of the valve 40 the spaces not engaged by the pins 43b may be provided with an end portion 40c thereby making the valve 40 more rigid. It is to be noticed that the teeth 40b must have a small circumferential extension and be uniformly spaced as in other case the outlet from the channel formed between the central hub and the crescent-shaped portion will be temporarily closed.

By the synchronizing means 45–47 the surfaces of the tooth spaces of the valve and of the teeth 43b of the inner rotor may be rough as the surfaces of said elements do not come into contact with each other *but always show the small play between facing surfaces of the pins 43b and the teeth 40b*. Thus said elements may be molded and only the faces having a sealing action need be machined.

I claim:

[1. A hydraulic rotary engine comprising in combination a cylindrical working chamber, a cylindrical hub portion concentric with said chamber so as to form an annular working space therein, said hub portion including two parts defining therebetween an arcuate groove eccentric with respect to the axis of said hub portion and intersecting said annular working space within the outer circumference thereof, a first rotor having axial teeth extending into said annular working space and making a sealing fit with said annular space, and a second rotor having axial teeth extending into said arcuate groove and its portion intersecting the annular working space from one side thereof to cooperate with the tooth spaces of said first rotor and making a sealing fit only with said arcuate groove.]

[2. A hydraulic rotary engine comprising in combination a cylindrical working chamber, a cylindrical hub portion concentric with said chamber so as to form an annular working space therein and defining in said hub portion an arcuate groove eccentric with respect to the axis of said hub portion and intersecting said annular working space within the outer circumference thereof, a first disk shaped rotor having a peripheral array of axial teeth extending into said annular working space from one side thereof and making a sealing fit with said annular space, and a second rotor having axial teeth extending into said arcuate groove and its portion intersecting the annular working space from the opposite side thereof to cooperate with the tooth spaces of said first rotor and making a sealing fit only with said arcuate groove.]

[3. A hydraulic rotary engine comprising in combination a cylindrical working chamber, a cylindrical hub portion concentric with said chamber so as to form an annular working space therein and defining in said hub portion an arcuate groove eccentric with respect to the axis of said hub portion and intersectiong said annular working space within the outer circumference thereof, a first annular rotor rotatably mounted in said cylindrical working chamber to form the outer circumferential wall of said annular working space, said first rotor having axial teeth formed at its inner circumferential surface, and a second rotor having axial teeth extending into said arcuate groove and its portion intersecting the annular working space from one side thereof to cooperate with the tooth spaces of said first rotor and making a sealing fit only with said arcuate groove.]

[4. A hydraulic rotary engine comprising in combination a cylindrical working chamber, a cylindrical hub portion concentric with said chamber so as to form an annular working space therein and defining in said hub portion an arcuate groove eccentric with respect to the axis of said hub portion and intersecting said annular working space within the outer circumference thereof, the part of said central hub comprising the bottom of said groove and the portion at one side thereof being slidable parallel with the axis of the working chamber, a first rotor having axial teeth extending into said annular working space and making a sealing fit with said annular space, and a second rotor rotatably connected with the slidable part of said central hub so as to be moved by the same, said second rotor having axial teeth extending into said arcuate groove and its portion intersecting the annular working space to cooperate with the tooth spaces of said first rotor and making a sealing fit with said arcuate groove only.]

[5. A hydraulic rotary engine comprising in combination a cylindrical working chamber, a cylindrical hub portion concentric with said chamber so as to form an annular working space therein, said hub portion including two parts defining therebetween an arcuate groove eccentric with respect to the axis of said hub portion and intersecting said annular working space within the outer circumference thereof, a first rotor having axial teeth extending into said annular working space and making a sealing fit with said annular space, a second rotor having axial teeth extending into said arcuate groove and its portion intersecting the annular working space to cooperate with the tooth spaces of said first rotor and making a sealing fit only with said arcuate groove, and means operable for synchronizing the movements of said first and said second rotor.]

*6. A hydraulic rotary engine comprising in combination a cylindrical working chamber, a cylindrical hub portion coaxial with said chamber so as to form an annular working space therein, said hub portion including two parts defining therebetween an arcuate groove having two coaxial cylindrical walls and opening at both ends into said space within the outer circumference thereof, a first rotor coaxial with said hub portion and having axial teeth having flat flanks received in said annular working space and making a sealing fit therewith, and a second rotor coaxial with said cylindrical walls and having axial teeth received in said arcuate groove and in the annular working space to cooperate with the tooth spaces of said first rotor while making a sealing fit with said arcuate groove only, the teeth of the second rotor having cylindrical faces engaging the flat flanks of the teeth of the first rotor, the axes of said faces being parallel with the rotor axes and their rotary path passing through the axis of the first rotor.*

*7. A hydraulic rotary engine comprising in combination a cylindrical working chamber, a cylindrical hub portion coaxial with said chamber so as to form an annular working space therein, said hub portion including two parts defining therebetween an arcuate groove having two coaxial cylindrical walls and opening at both ends into said space within the outer circumference thereof, a first disk shaped rotor coaxial with said hub portion and having a peripheral array of axial teeth having flat flanks received in said annular working space from one side thereof and making a sealing fit therewith, and a second rotor coaxial with said cylindrical walls and having axial teeth received in said arcuate groove and in the annular working space from the opposite side thereof to cooperate with the tooth spaces of said first rotor while making a sealing fit with said arcuate groove only, the teeth of the second rotor having cylindrical faces engaging the flat flanks of the teeth of the first rotor, the axes of said faces being parallel with the rotor axes and their rotary path passing through the axis of the first rotor.*

*8. A hydraulic rotary engine comprising in combination a cylindrical working chamber, a cylindrical hub portion coaxial with said chamber so as to form an annular workings space therein, said hub portion including two parts defining therebetween an arcuate groove having two coaxial cylindrical walls and opening at both ends into said space within the outer circumference thereof, a first annular rotor coaxial with said hub portion rotatably mounted in said chamber to form the outer circumferential wall of said annular working space and having axial teeth having flat flanks received in said annular working space and making a sealing fit therewith, and a second rotor coaxial with said cylindrical walls and having axial teeth received in said arcuate groove and in the annular working space to cooperate wth the tooth spaces of said first rotor while making a sealing fit with said arcuate groove only, the teeth of the second rotor having cylindrical faces engaging the flat flanks of the teeth of the first rotor, the axes of said faces being parallel with the rotor axes and their rotary path passing through the axis of the first rotor.*

*9. A hydraulic rotary engine comprising in combination a cylindrical working chamber, a cylindrical hub portion coaxial with said chamber so as to form an annular working space therein, said hub portion including two parts defining therebetween an arcuate groove having two coaxial cylindrical walls and opening at both ends into said space within the outer circumference thereof, a first rotor coaxial with said hub portion and including axial teeth having flat flanks and being received in said annular working space and making a sealing fit therewith, and a second rotor coaxial with said cylindrical walls and having axial teeth received in said arcuate groove and in the annular working space to cooperate with the tooth spaces of said first rotor while making a sealing fit with said arcuate groove only, the teeth of the second rotor having cylindrical faces engaging the flat flanks on the teeth of the first rotor, the axes of said faces being parallel with the rotor axes and their rotary path passing through the axis of the first rotor, the number of teeth of the first rotor being twice the number of teeth of the second rotor.*

(References on following page)

References Cited by the Examiner

The following references, cited by the Examiner, are of record in the patented file of this patent or the original patent.

UNITED STATES PATENTS

| | | | |
|---|---|---|---|
| 1,442,828 | 1/23 | Rotermund | 103—126 |
| 1,636,259 | 7/27 | Sweeney | 103—126 |
| 1,994,397 | 3/35 | Loveridge et al. | 103—126 X |

| | | | |
|---|---|---|---|
| 2,344,879 | 3/44 | Johnson | 103—125 |
| 2,442,130 | 5/48 | Johnson | 103—120 |

FOREIGN PATENTS

| | | |
|---|---|---|
| 977,510 | 11/50 | France. |
| 3,801 | 1888 | Great Britain. |

KARL J. ALBRECHT, *Primary Examiner.*

JOSEPH H. BRANSON, JR., *Examiner.*